June 5, 1962  F. T. COX, JR., ET AL  3,037,584
WEDGE ACTUATED BRAKE ASSEMBLY
Filed Sept. 2, 1958  7 Sheets-Sheet 1

INVENTORS
FRANK T. COX, JR.
CLARKE F. THORNTON
BY Strauch, Nolan & Neale
ATTORNEYS June 5, 1962  F. T. COX, JR., ET AL  3,037,584
WEDGE ACTUATED BRAKE ASSEMBLY
Filed Sept. 2, 1958  7 Sheets-Sheet 2
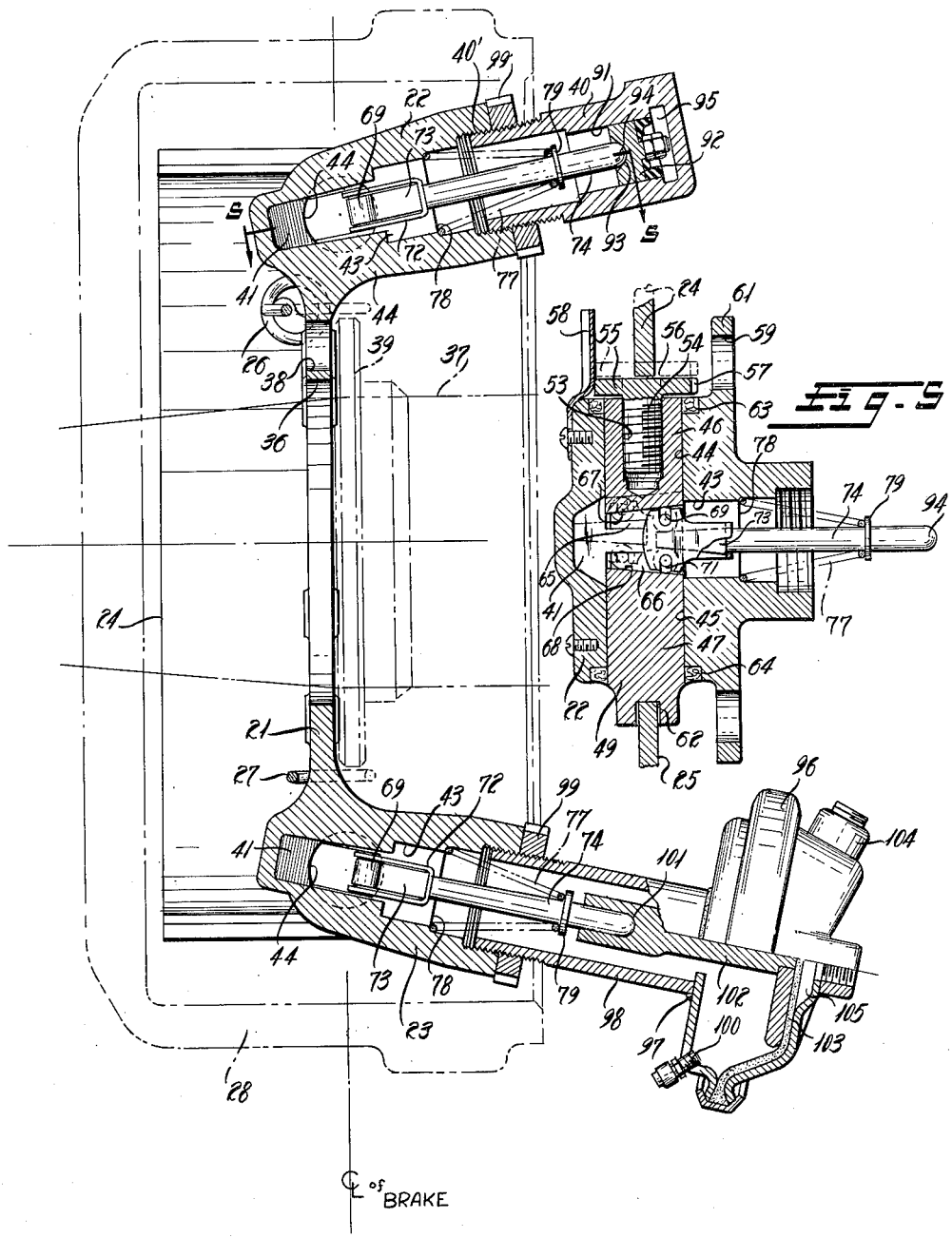
INVENTORS
FRANK T. COX, JR.
BY CLARKE F. THORNTON
Strauch, Nolan & Neale
ATTORNEYS INVENTORS
FRANK T. COX, JR.
CLARKE F. THORNTON
BY Strauch, Nolan & Neale
ATTORNEYS

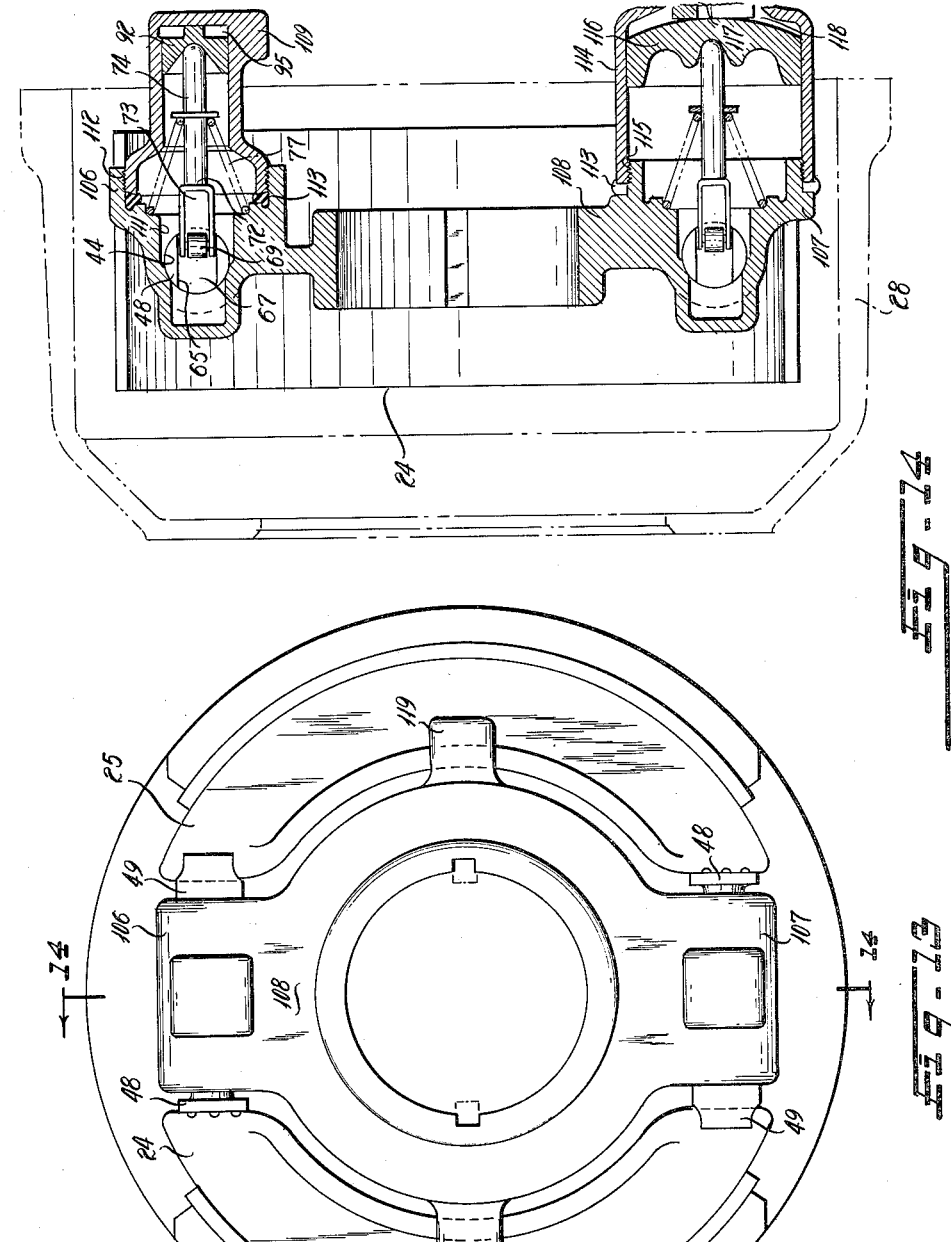

June 5, 1962  F. T. COX, JR., ET AL  3,037,584
WEDGE ACTUATED BRAKE ASSEMBLY
Filed Sept. 2, 1958  7 Sheets-Sheet 5

INVENTOR.
FRANK T. COX, JR.
BY CLARKE F. THORNTON
ATTORNEYS

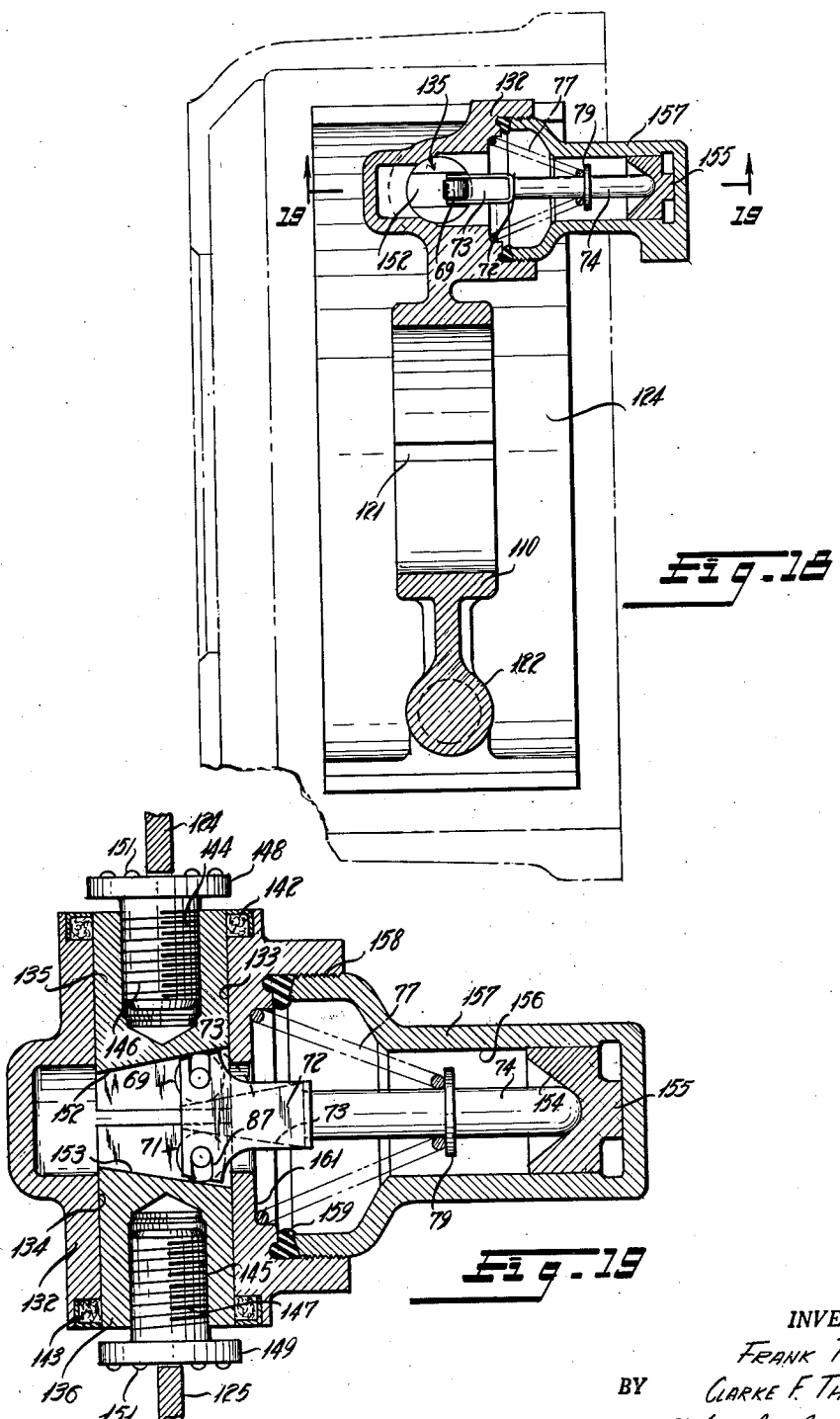

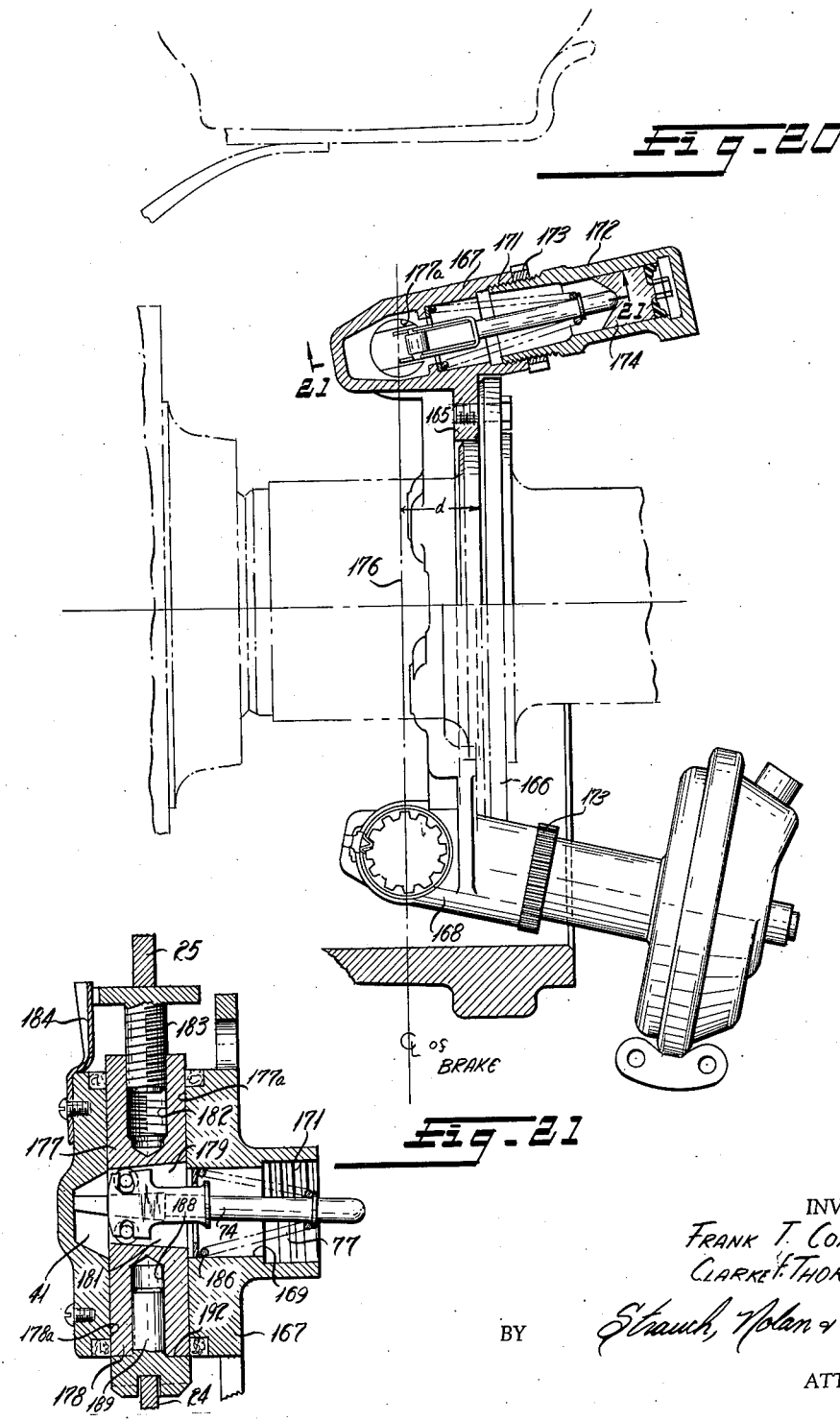

United States Patent Office 3,037,584
Patented June 5, 1962

3,037,584
WEDGE ACTUATED BRAKE ASSEMBLY
Frank T. Cox, Jr., and Clarke F. Thornton, Ashtabula, Ohio, assignors to Rockwell-Standard Corporation, Coraopolis, Pa., a corporation of Pennsylvania
Filed Sept. 2, 1958, Ser. No. 758,501
11 Claims. (Cl. 188—78)

This invention relates to vehicle brakes and more particularly to an internally expanding wedge actuated brake mechanism and associated support.

Heavy duty brake mechanism usually incorporates a supporting means known as spider supported substantially centrally inside the brake drum and welded or otherwise secured to the usual axle housing flange. The present invention discloses a novel brake spider construction in connection with a special wedge actuated brake mechanism characterized by the fact that the wedge housing is cast integral with the spider to assure a proper location of the actuating mechanism. The actuator chamber, either hydraulic or air, can be attached directly to the wedge housing to actuate the wedge rod to spread the brake shoes apart without the aid of additional levers or cranks.

This compact arrangement assures a perfect actuation of the brake at all times and the assembly can be either a fixed anchor type with actuation at one end of the shoes or a double ended balanced type with actuation at both ends of the shoes. The present invention also incorporates a novel wedge brake actuating mechanism employing a floating wedge member inserted between two floating rollers mounted together in a common cage.

In brake assemblies incorporating an operating wedge acting on the brake shoes through the medium of anti-friction elements, such as rollers, to force adjacent ends of brake shoes apart to apply pressure to frictionally contact the shoes with the brake drum it has been found that due to the magnitude of the actuation force exerted the load on the rollers or other anti-friction means sometimes reaches an excessive and undesirable value.

It is a major object of the present invention to overcome this fault by reducing the stress exerted on the anti-friction elements during braking action by a novel roller wedge arrangement.

Another object of the present invention is the provision of a brake of compact and durable design having the brake supporting means and actuation housing combined in a single unit.

Still another object of the present invention is the provision in a vehicle brake of a novel brake spider with integrally cast wedge actuation housings.

A further object of the present invention is the provision of a vehicle brake in which the brake expanding mechanism comprises a device moving at an angle to the plane of movement of the brake shoes and having a special wedging action on the shoes.

Still a further object of the present invention is the provision of a roller cage in a vehicle brake actuating mechanism containing anti-friction means floatingly disposed on opposite sides thereof and receiving a floating reciprocating wedge member between the rollers.

Another object of the present invention is the provision of floating anti-friction means such as rollers in a vehicle brake actuating mechanism so arranged as to cooperate with a floating wedge member and inclined surfaces at opposite ends of brake shoes as to reduce the stresses and friction encountered during brake actuation to a minimum.

It is an object of the invention to provide a brake mechanism housing containing the fluid pressure responsive actuator element and the roller and wedge mechanism for spreading the brake shoe connected plungers, and sealed to keep out dust, dirt and moisture.

A further object of the invention is to provide a novel brake actuation arrangement wherein shoe connected plungers are separated by a roller wedge device and wherein the plungers anchor at their inner ends on surfaces of maximum area for transmitting torque forces to the spider and mounting flange.

It will become evident that the wedge actuation mechanism can be used apart from the novel brake spider construction in a brake equipped with a conventional backing plate, actuation may be achieved by air, hydraulic fluid or mechanically, and the brake may be of the fixed anchor type or of the double ended balanced or servo types.

The preferred embodiments are disclosed hereafter as constituting a spider mounting a wedge actuated brake mechanism primarily intended for rugged, heavy duty vehicles including trucks, trailers, buses and construction equipment.

The description follows with reference to the accompanying drawings in which:

FIGURE 1 is an end view of a brake assembly of the double ended balanced type with the right brake shoe removed for clarity and incorporating the invention;

FIGURE 2 is a section through the lower end of the brake assembly of FIGURE 1 substantially along line 2—2;

FIGURE 3 is a half section through brake shoe, web, and centering means along line 3—3 of FIGURE 1;

FIGURE 4 is a vertical section along line 4—4 of FIGURE 1 showing both hydraulic and air actuation and on a larger scale than FIGURES 1-3;

FIGURE 5 is a section through the wedge housing of the brake of FIGURE 1 along line 5—5 of FIGURE 4 but with the actuator housing removed;

FIGURE 5A is a section on line A—A of FIGURE 5;

FIGURE 13 shows another embodiment of a brake according to the present invention with a different spider structure;

FIGURE 14 is a section through the brake of FIGURE 13 on line 14—14;

FIGURE 18 is a vertical section through the brake of FIGURE 15;

FIGURE 19 is an enlarged section through the wedge and actuator housing along line 19—19 of FIGURE 18;

FIGURE 20 is a section through a brake assembly according to another embodiment; and FIGURE 21 is a section on line 21—21 of FIGURE 20 through the wedge housing but with actuator housing removed.

Like reference numerals designate like parts on the drawings and in the description.

Figure 6:
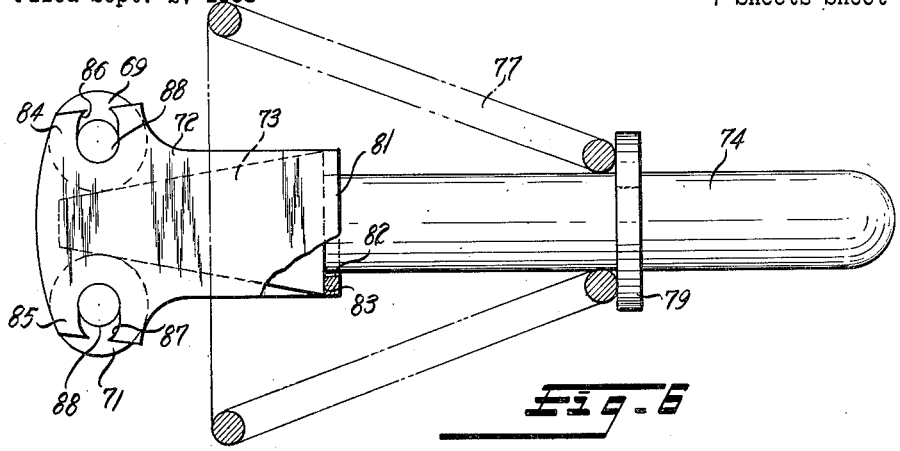
FIGURE 6 shows in enlarged detail parts of the roller and wedge actuator assembly common to all embodiments.
Figure 7:
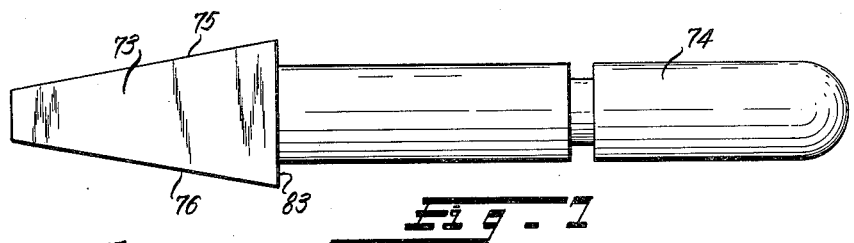
FIGURE 7 is a side elevation of the wedge and push rod of FIGURE 6.
Figures 9, 11, 12:
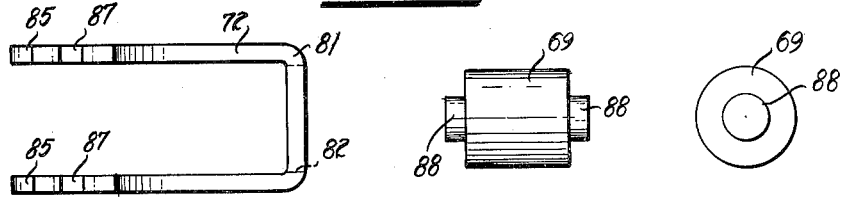
FIGURES 9 and 10 are side and end views respectively of the roller cage of FIGURE 8.
FIGURES 11 and 12 are side and end views respectively of the cylindrical rollers of the assembly of FIGURE 7.
Figures 8, 10:
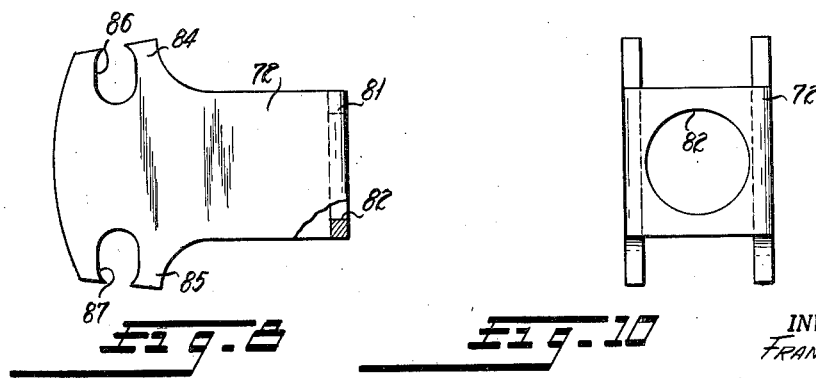
FIGURE 8 is a plan view of the roller cage.
Figure 15:
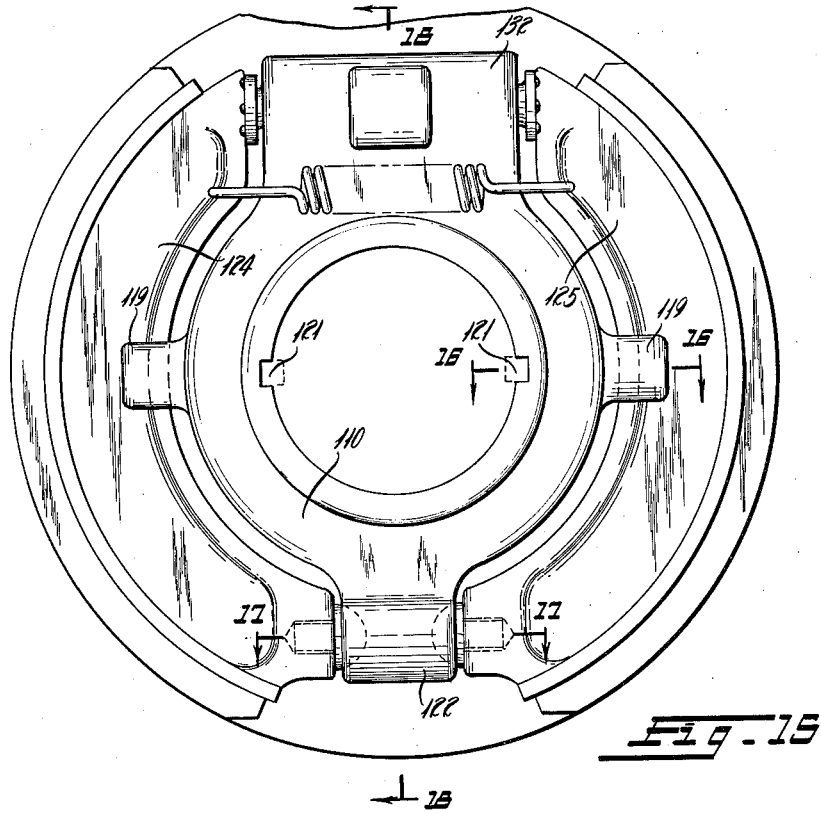
FIGURE 15 is an end view of a modified version of the brake of the invention featuring the fixed anchor type.

With reference to FIGURE 1 there is shown a brake mechanism and supporting means adapted to be attached to the axle of a vehicle. One brake shoe has been omitted from the drawing to show more clearly the brake supporting spider.

The brake mechanism is assembled around a centrally located spider 21 having upper and lower integrally cast wedge actuation housings 22 and 23 of identical shape. The brake is of the double ended balanced type and includes identical full floating brake shoes 24 and 25, only the forward shoe 24 is shown in FIGURE 1, and actuation is made at opposite ends of the spider 21. Brake shoes 24 and 25 are held in retracted position by an upper return spring 26 and a lower return spring 27. These springs are similarly attached at opposite ends to the respective shoe webs. Brake shoes 24 and 25 are centered with respect ot the brake drum 28 by a spring clip 29 (FIGURE 3) secured as by rivets 31 at the transverse centerline of the brake to the spider 21. Spring clip 29 embraces the web 32 of the brake shoe and urges it against a flat abutment face 33 on the spider. In this manner both brake shoes are centrally aligned within the drum enclosure, and each clip 29 permits slidable rocking operational displacement of the shoe.

The open rear part of the brake assembly may be closed by a dust shield 34 secured to spider 21 as by screws 35 to protect the brake interior against dirt and moisture.

Spider 21 has a central opening 36 fitting over the axle housing 37 (FIGURE 4) and a series of rivet holes 38 for attachment to axle flange 39. A brake actuator housing 40 is threadedly connected to the wedge housing at 40′ (FIGURE 4).

The special construction of the spider 21 provides a series of symmetrical indentions and abutments first to guide and locate the brake shoes 24 and 25 with respect to the brake drum and secondly to stiffen the structure of the spider itself to be able to absorb maximum braking forces. As shown in FIGURE 4 the spider 21 projects inwardly of the axle at upper and lower ends into the integral extending wedge housings 22 and 23 respectively. The integral wedge housings 22 and 23 may diverge from the spider 21 at a slight angle as in FIGURE 4 or may extend at right angles as in FIGURES 14 and 18.

With reference to FIGURES 4, 5 and 5A wedge housing 22 has a side opening 43 that enters an actuation chamber 41 within the housing. On opposite ends housing 22 is formed with cylindrical bores 44 and 45 that are coaxial and preferably of the same size. Plungers 46 and 47 are slidably mounted in these bores. The inner end of plunger 46, when the brake is idle, seats upon the bottom of bore 44 at 48, and the inner end of plunger 47 similarly seats upon the bottom of bore 45 at 49, to provide maximum bearing surface for both plungers. Chamber 41 opens into the bottoms of both bores 44 and 45 through opening 51 which, FIGURE 5A, permits disposition of the roller and wedge assembly between the plungers as will appear. Plunger 46 has an internal threaded bore 53 to receive a threaded adjustment member 54 having an enlarged head 55 providing a flat face 56 against which abuts the arcuate end of shoe 24. The head of adjustment member 54 is circumferentially provided with a series of equally spaced recesses 57 for locking it in adjusted position by means of a spring arm 58 anchored at one end on the housing. Thus as member 54 is rotated in bore 53 it shifts axially with respect to plunger 46 and changes the location of face 56 to displace shoe 24 to desired position, and head 55 may be marked to indicate the adjustment. This adjustment is usually made through suitable openings 59 in transverse covering flange 61 of the wedge housing.

The other plunger 47 preferably has no adjustment and its outer face is grooved at 62 to rockably slidably abut the adjacent end of shoe 25. Lubricant seals 63 and 64 are provided at the outer ends of plunger bores 44 and 45.

Plungers 46 and 47 are provided at their inner ends with slots 65 and 66 respectively having inclined rolling surfaces 67 and 68 on which rollers 69 and 71 roll during actuation of the brake.

Rollers 69 and 71 are floatingly carried in a spring clip type carrier cage 72 and are disposed in rolling engagement with the opposite inclined sides of a wedge member 73 mounted on the inner end of a push rod 74 extending through bore 43. The opposite sides of member 73 are parallel to the angles of the inclined plunger rolling surfaces 66 and 67. Wedge member 73 is normally biased toward brake retracted position by means of a frusto-conical coil spring 77 compressed between internal shoulder 78 of the opening 43 and a fixed stop 79 on rod 74. FIGURES 8–11 show the wedge and roller assembly apart from the rest of the brake.

The cage 72 is preferably an integral light gauge spring steel part bent into substantial U-shape and provided at the bridge portion 81 with an opening 82 adapted to loosely pass rod 74 but small enough to abut against back shoulder 83 of wedge member 73 so that movement of rod 74 to the right in FIGURES 5 and 6 carries the member 72 along with it. Cage 72 is formed with parallel upper and lower oppositely extending lateral arms 84 and 85 that have outwardly open slots 86 and 87 to receive the arbors 88 of the rollers 69 and 71. Preferably the outer ends of slots 86 and 87 are pinched into a dimension less than the diameter of arbor 88 so that rollers 69 and 71 are free to shift inwardly or outwardly in their slots but cannot leave them. Slots 86 and 87 in the assembly are normal to the axis of opening 82. The opening 82 is of such size as to allow free sliding of rod 74 therethrough and also, for a purpose to appear, allow some rocking of member 72 with respect to the axis of rod 74 in the plane of the paper in FIGURE 6.

Upper wedge housing 22 in FIGURE 4 is shown as connected to a hydraulic actuator 40 wherein hydraulic cylinder 91 contains a slidable piston 92 formed with a spherical socket 93 to rockably seat the spherical end 94 of rod 74. When hydraulic liquid is introduced into cylinder chamber 95 wedge 73 is advanced to apply the brakes. When hydraulic pressure is relieved spring 77 retracts the wedge.

In operation, with both upper and lower wedge assemblies powered by hydraulic actuators as shown in the upper part of FIGURE 4, introduction of hydraulic liquid into upper and lower chambers 95 displaces each push rod 74 inwardly so that wedges 73 acting through rollers 69 and 71 displace plungers 46 and 47 outwardly and thereby simultaneously shift both brake shoes 24 and 25 substantially radially outwardly into frictional contact with the rotating drum 28 on the associated wheel. While plungers 46 and 47 may be initially equally outwardly displaced, once the brake shoes engage the rotating drum the latter tends to shift the shoes in the direction of rotation with an essentially self-energizing or shoe wrapping action. As a result, assuming drum rotation as indicated in FIGURE 1, the upper and lower plungers 47 will be urged tightly against respective bore bottoms 49 and the full displacement effect of the wedge will take place at plunger 46 which is the condition shown in dotted lines in FIGURE 5. In order to accomplish this rod 74 must be capable of slight angular movement, which is possible because of its spherical bearing on the piston 92. Furthermore, the foregoing floating mount for rollers 69 and 71 whereby cage 72 essentially loosely floats on the push rod and rollers 69 and 71 are free to float on cage 72 provides a compensating structure whereby the longitudinal displacement of rod 74 is translated eventually into outward shift of plunger 46 is accomplished with a minimum of frictional resistance, no binding of the elements and equalization of load.

The foregoing action is true whether the rods 74 are hydraulically operated as in the upper part of FIGURE 4, or pneumatically operated as in the lower part of FIGURE 4.

It will be noted that the threaded mounting of the actuator housing 40 permits axial adjustment of wedge 73 to the desired location for compensation of manufacturing tolerances occurring in the various actuation components, (i.e., plungers 46 and 47, roller diameters of 69 and 71, width of wedge face 73 to 76, and length of wedge push rod 74).

The lower wedge housing 23 illustrates the structure wherein a compressed air actuator is used. A diaphragm casing 96 having welded thereon as at 97 a cylindrical push rod housing 98 which is threaded into the internally threaded open end of the wedge housing 23 and secured thereto by a lock nut 99. Push rod 74 has its end in removable socketed engagement at 101 with diaphragm rod 102 secured to a flexible diaphragm 103. An air inlet fitting 104 provides for connecting chamber 105 to an external air pressure source. A breather fitting is provided at 100 to permit diaphragm pulsation. It will be observed that the push-connection consisting of rods 74 and 102 is axially rigid, and that the flexibility of diaphragm 103 will permit necessary angular movement of this connection during operation. Operation by either hydraulic or pneumatic actuators is essentially the same.

The double ended balanced type of brake just described is a preferred embodiment of the present invention. Because of its compact and rugged structure it will perform under even severe conditions. Manufacturing, assembly and maintenance costs are reduced to a minimum. The movable parts of the brake actuation mechanism need only occasional lubrication. The threadedly attached actuator housings can be easily attached or removed from the integral wedge housings for speedy servicing and repair or substitution of actuators.

Optionally the outer ends of housing openings 43 may be identically formed so that motor casings may be provided with identical threaded attachment ends and either hydraulic or pneumatic motors may be selectively used on the same spider. This reduces inventory, greatly aids manufacturing processes, and enables replacement of hydraulic with pneumatic actuators as desired.

FIGURES 13 and 14 illustrate the invention as applied to a brake assembly wherein the integral wedge housings 106 and 107 project at right angles to spider 108. The internal structure of housings 106 and 107 and the associated plunger, roller and wedge structures are essentially the same as in the foregoing embodiment as indicated by the same reference numerals.

When a hydraulic actuator is used as in the top part of FIGURE 14, the hydraulic cylinder casing 109 is threaded directly into the open end of the bore 111 of housing 106 at 112 and lock ring 113 is clamped between them.

Where a pneumatic motor is used as in the lower part of FIGURE 14, the casing 114 is threaded at 115 directly onto the open end of housing 107, and piston 116 is operated to apply the brakes by introducing air through fitting 117 into chamber 118.

Spider 108 has extending from opposite sides thereof spaced integral fingers 119 disposed on opposite sides of the brake shoe webs so as to center and guide the shoes during operation.

Referring now to FIGURES 15–19, the brake assembly comprises centrally located spider 110 supporting two brake shoes 124 and 125 in laterally spaced relationship therefrom. Fingers 119 slidably embrace the shoe webs in FIGURE 13. Spider 110 is a cast unit secured and located on the axle housing 120 by means of two opposite positioned keys 121 engaging respective keyways on the axle housing and center bore of the spider.

Figures 16, 17:
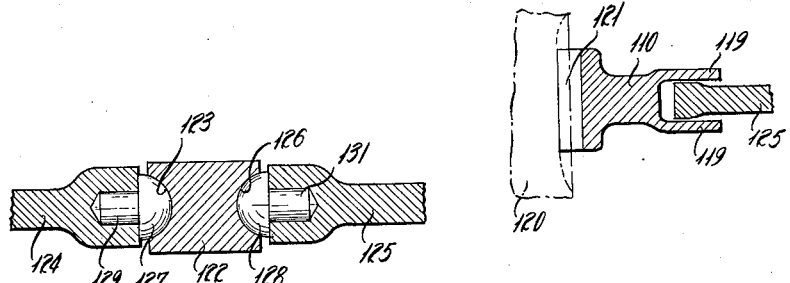
FIGURE 16 is a partial section through the brake shoe centering means along line 16—16 of FIGURE 15.
FIGURE 17 shows a section through the anchor end of the brake of FIGURE 15 along line 17—17.

At the lower or anchor end, spider 110 converges to a boss 122 provided on opposite lateral faces with semi-spherical recesses 123 and 126 to receive in pivoting engagement the matching semi-spherical heads of pivot anchor bolts 127 and 128, pressed into the broadened ends of the respective brake shoe webs at 129 and 131 to allow the brake shoes to pivot therein (FIGURE 17). At the actuation end spider 110 is provided with an integral inwardly closed wedge housing generally indicated at 132, and shown in detail in FIGURES 18 and 19.

Aligned smooth cylindrical bores 133 and 134 are formed in housing 132 to slidably receive opposed cylindrical plungers 135 and 136. The outer ends of bores 133 and 134 are enlarged to receive seals 142 and 143 respectively. Plungers 133 and 134 are provided with threaded bores 144 and 145 to receive externally threaded adjustment members 146 and 147 which have outwardly exposed heads 148 and 149 against which abut the respective brake shoe web ends. These heads are provided with small semi-spherical projections 151 which abut against opposite sides of the brake shoe webs and thereby prevent the adjustment members from turning. The inner ends of plungers 135 and 136 which abut against an integral flange within the wedge housing in the released position of the brake as illustrated in FIGURE 19, may be formed with transverse converging inclined machined and ground slots 152 and 153 which laterally guide and provide rolling surfaces for adjacent rollers 69 and 71.

As in the other embodiments, rollers 69 and 71 are floatingly mounted in roller cage 72 which preferably is made of spring steel to assure a certain flexibility at assembly whereby the sides can be bent apart to insert the roller arbors into slots 86 and 87. Slots 86 and 87 have been made elongate so as to allow the rollers to shift laterally outwardly for balancing the thrust imposed during the wedge actuation and furthermore reducing the stress load on the rollers.

Push rod 74 seats in the socket 154 of piston 155 slidable in a hydraulic cylinder 156 formed in a casing 157 threaded into the open side of housing 132 at 158. A rubber seal gasket 159 is placed between the end of the casing 157 and housing 132. The inner end of conical coil spring 77 seats in this assembly on annular ledge 161 in the housing 132.

In operation in this embodiment of the invention, the hydraulic fluid is introduced into the cylinder to displace piston 155 and wedge 73 to the left in FIGURE 19. This causes outward balanced thrust displacement of the plungers 135 and 136 and the travel of each brake shoe is determined by the axial position of adjustment member 146 or 147. The shoes 124 and 125 are swung outwardly by displacement of the plungers and they rock about their anchor pivots at 122.

FIGURES 20 and 21 illustrate an embodiment of the invention wherein the parts are so located as to provide optimum balance of forces during brake actuation.

Spider 165 is suitably secured as by studs to axle flange 166 and is formed at its upper and lower ends with integral wedge actuation housing 167 and 168 that are essentially of the same shape. Each housing has a side opening 169 internally threaded at 171 to receive hydraulic motor housing 172 in a fluid tight joint that is locked by nut 173. Housing 167 as illustrated projects a considerable distance to the opposite side of the spider 165 from piston 174, and the plunger cross bores 177a and 178a all have their axes lying in a plane 176 that contains the centerline of the brake assembly and is displaced axially outwardly from the plane where the spider 165 is attached to the axle flange by a distance indicated at $d$.

The wedge and roller assembly and its actuation by piston 174 are essentially the same as in the other embodiments, and the actuation of the brake is the same except that the above described offset of the plunger axes with respect to the spider allows desirable space advantages to accommodate varying designs of wheels, drums, and axle flange in certain heavy duty constructions.

Referring to FIGURE 21 the slidable plungers 177 and 178 inserted in smooth cylindrical coaxial bores 177a and 178a of wedge housing 167 are grooved at their inner ends at 179 and 181 respectively to receive the rollers of the roller and wedge assembly and abut with their ends against an integral flange as in the other embodiments. It will be noted that the bottom of chamber 41 is a stop to limited inward movement of the wedge and thus prevent the rollers from contacting the housing. Plunger 177 has a threaded bore at 182 for mounting the adjustment member 183 releasably locked by spring 184, the parts being shown in maximum adjustment position. In this embodiment spring 77 of the roller wedge assembly seats against a washer 186 abutting the tapered wall of opening 169.

Plunger 178 has a smooth bore 188 slidably receiving anchor member 189 which has a head grooved at 191 to receive the brake shoe web. Member 189 bottoms at 192 during forward rotation of the brake drum and when the brakes are applied as described in the foregoing.

The brake assembly of the present invention comprises a compact and rugged design characterized chiefly by the integral cast spider and wedge housing unit which not only adds to a simplified and therefore cheaper construction but still retains the characteristics of a heavy duty brake. The special floating roller and wedge arrangement provides equalized thrust during brake actuation and reduces friction in the actuating mechanism.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake assembly adapted for coaction with a surrounding relatively rotating drum, a support, at least two brake shoe assemblies mounted on said support for outward displacement into frictional contact with said drum, and actuator means disposed between adjacent shoe assembly ends comprising opposed slidable plungers on said support having their outer ends operatively connected to said shoe assemblies, a wedge member mounted for substantially reciprocatory movement between the adjacent ends of said plungers, rollers mounted between said plungers and the adjacent sides of said wedge member, a floating roller carrier mounted for movement relative to and with said wedge member, and a fluid pressure actuated motor mounted on said support and operatively connected to said wedge.

2. In the brake assembly defined in claim 1, said carrier comprising a member loosely mounted on said wedge member and said rollers having arbors slidably mounted in elongated transverse guides openings in said carrier.

3. In a brake assembly, a support, at least two brake shoe assemblies mounted on said support, and actuator means disposed between adjacent shoe assembly ends comprising aligned opposed plungers slidably mounted on said support and operatively connected at their outer ends to said brake shoe assemblies, a wedge member mounted for movement between said plungers, grooves on the inner ends of said plungers having inclined bottom surfaces, said surfaces being substantially parallel to the opposite inclined sides of said wedge member, rollers disposed between the inclined sides of said wedge member and said plunger groove bottom surfaces, and a carrier member for mounting said rollers mounted for movement with said wedge member and for longitudinal movement and slight rocking movement relative to said wedge member, said roller mounting carrier having transverse roller guide slots permitting transverse displacement of the rollers with longitudinal displacement of said plungers.

4. In a brake assembly comprising a rotatable brake drum mounted in surrounding relation and open inwardly to an axle, brake mechanism supporting spider adapted to be attached to the vehicle axle axially within said brake drum, and at least two circumferentially spaced actuator housings integral with said spider, each said housing having an inner side opening, fluid pressure motors each having a tubular coupling section removably secured to an associated actuator housing and a portion containing a shiftable pressure responsive element, and actuator mechanism connected to each said element and extending into the associated housing, said housings being oppositely inclined with respect to the axis of the axle so that said housing diverges from said spider toward the inner open end of said brake drum so that said motor portions are disposed essentially entirely outside the confines of said drum.

5. A wedge type brake subassembly consisting essentially of a push rod having a fixed wedge at one end and its other end formed to seat on the fluid pressure responsive element of an actuating motor, said wedge having a surface facing said other end of the rod, a roller carrier loosely mounted on said push rod, rollers mounted on said carrier for rolling contact with opposite sides of said wedge, said roller mounting permitting free displacement of said rollers normal to the push rod axis, spring means mounted on said push rod, a stop on the push rod for engaging one end of the spring, said spring means being a coil spring assembly having a portion smaller than the wedge to prevent it from being separated from the push rod in the subassembly.

6. In a brake assembly adapted for coaction with a surrounding relatively rotating drum, a support, at least two brake shoe assemblies mounted on said support for outward displacement into frictional contact with said drum, and actuator means disposed between adjacent shoe assembly ends comprising opposed slidable plungers on said support having their outer ends operatively connected to said shoe assemblies, a wedge member mounted for substantially reciprocatory movement between the adjacent ends of said plungers, rollers mounted between said plungers and the adjacent sides of said wedge member, a floating roller carrier mounted for movement relative to and with said wedge member, a fluid pressure actuated motor mounted on said support and operatively connected to said wedge, said carrier being a substantially U-shaped cage having a bridge end and an opposite open end, a motor connected push rod secured to said wedge member and extending loosely through an opening in the bridge, oppositely extending transverse slots near the open end of said carrier, and said rollers having their opposite ends slidably mounted in said slots.

7. A wedge type brake subassembly consisting essentially of a push rod having a fixed wedge at one end and its other end formed to seat on the fluid pressure responsive element of an actuating motor assembly, said wedge having a surface facing said other end of said rod, a roller carrier loosely mounted on said push rod, rollers mounted on said carrier for rolling contact with opposite inclined sides of said wedge, said carrier being formed with transverse slots for permitting free lateral displacement of said rollers normal to the push rod axis, and said carrier having a portion abutting said wedge surface for limiting longitudinal displacement of said carrier along the push rod in the direction of the wedge end of said rod.

8. In the subassembly defined in claim 7, said carrier being a substantially U-shaped member having said roller mounting and retainer slots formed in its legs and having an apertured bridge slidably receiving said push rod adjacent said surface.

9. In a brake assembly comprising a rotatable drum that is open inwardly to an axle, a spider having a central vertical portion adapted to be attached to an axle flange radially inwardly of said drum, two circumferentially spaced actuator housings integral with said spider and each having a side opening, said housings diverging from the center of the spider toward the open end of the drum, fluid pressure motors removably mounted upon said housings at said openings on axes extending in diverging relation from said spider, aligned cross bores formed in each of said housings and reciprocable plungers in said bores adapted at their outer ends for brake shoe actuation, all of said plungers having their axes lying substantially in a common vertical plane spaced from one side of said central portion of the spider, and said motor casings projecting away from the other side of said central portion of the spider.

10. In a brake assembly adapted for coaction with a surrounding relatively rotating drum, a support, at least two brake shoe assemblies mounted on said support for outward displacement into frictional contact with said drum, and actuator means disposed between adjacent shoe assembly ends comprising opposed slidable plungers on said support having their outer ends operatively connected to said shoe assemblies, a wedge member mounted for substantially reciprocatory movement between the adjacent ends of said plungers, anti-friction elements mounted between said plungers and the adjacent sides of said wedge member, a floating carrier for said anti-friction elements mounted for movement relative to and with said wedge member, and a fluid pressure actuated motor mounted on said support and operatively connected to said wedge.

11. In a brake assembly, a support, at least two brake shoe assemblies movably mounted on said support, and actuator means disposed between adjacent shoe assembly ends comprising aligned opposed plungers slidably mounted on said support and operatively connected at their outer ends to said brake shoe assemblies, a wedge member mounted for reciprocable movement between said plungers and having opposite inclined sides, rollers disposed in rolling engagement between the inclined sides of said wedge member and said plungers, and a carrier member for mounting said rollers mounted for movement with said wedge member and for longitudinal movement and slight rocking movement relative to said wedge member, said carrier having spring arms formed with roller receiving slots for operatively positioning said rollers in the assembly and permitting transverse displacement of said rollers with longitudinal displacement of said plunger.

References Cited in the file of this patent

UNITED STATES PATENTS

| | | |
|---|---|---|
| 1,848,775 | Girling | Mar. 8, 1932 |
| 1,968,667 | White | July 31, 1934 |
| 2,148,240 | La Brie | Feb. 21, 1939 |
| 2,211,439 | Schnell et al. | Aug. 13, 1940 |
| 2,475,492 | Goepfrich et al. | July 5, 1949 |
| 2,527,126 | Geopfrich et al. | Oct. 24, 1950 |

FOREIGN PATENTS

| | | |
|---|---|---|
| 552,174 | Great Britain | Mar. 25, 1943 |
| 571,712 | Great Britain | Sept. 5, 1945 |
| 785,864 | Great Britain | Nov. 6, 1957 |